Figure 4:
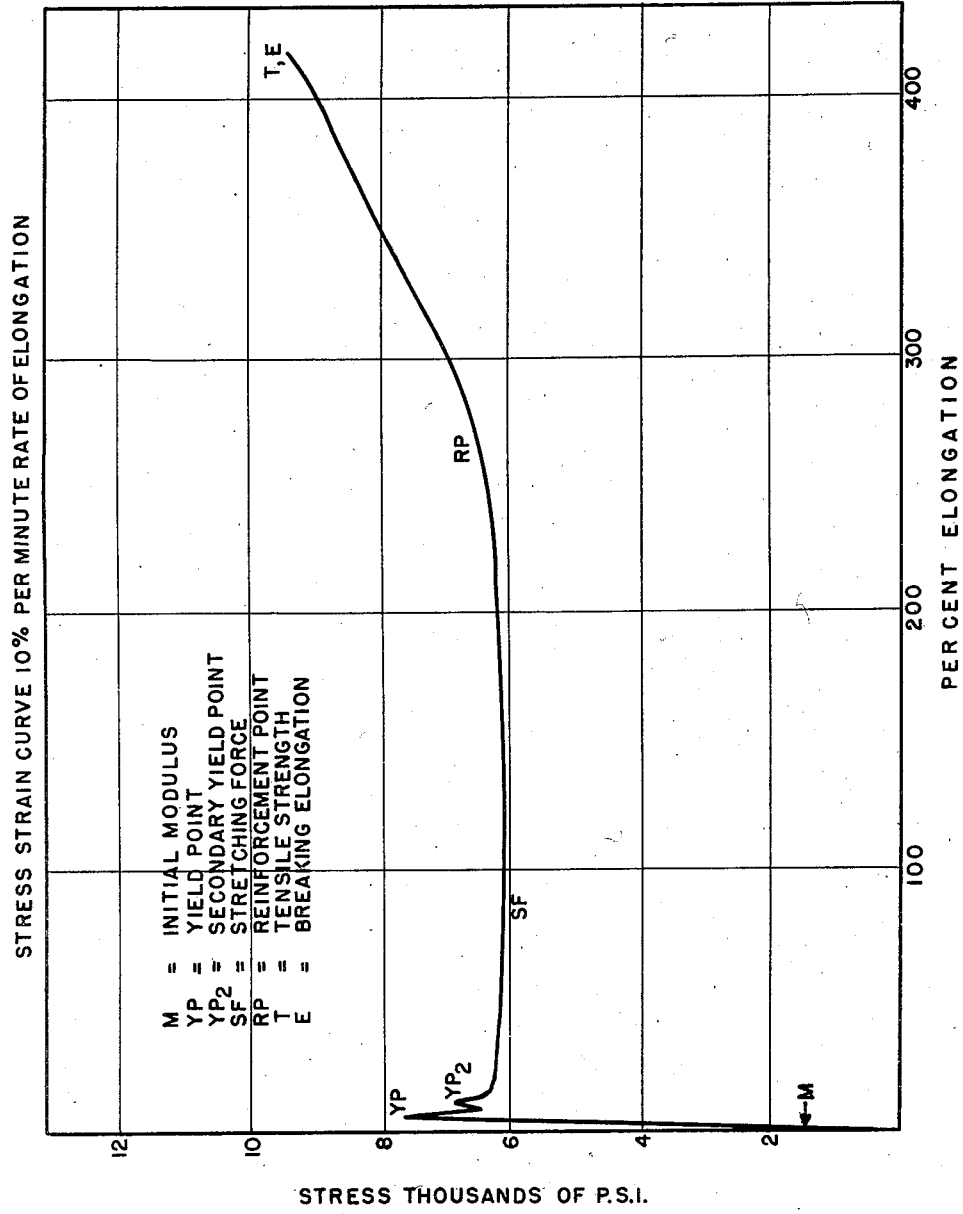
Figure 13:
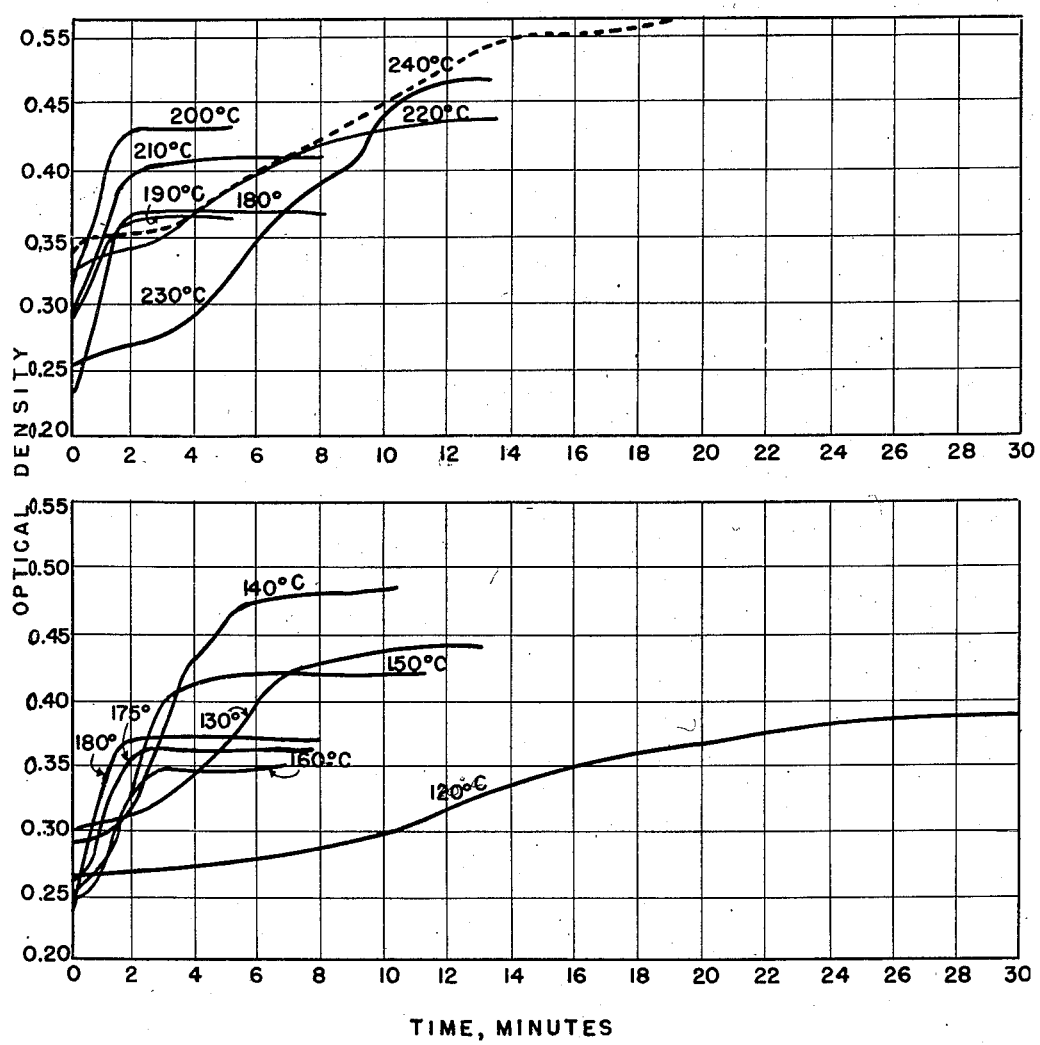

Feb. 18, 1958     A. C. SCARLETT     2,823,421
STRETCHING OF POLYETHYLENE TEREPHTHALATE FILM
Filed May 12, 1952     16 Sheets-Sheet 1
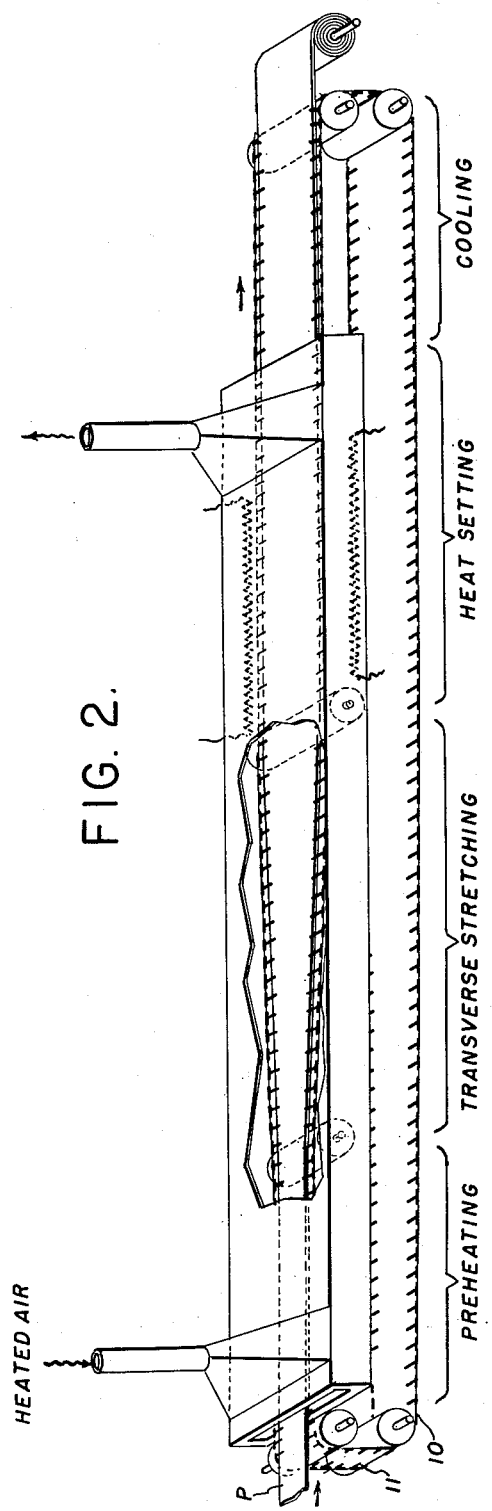
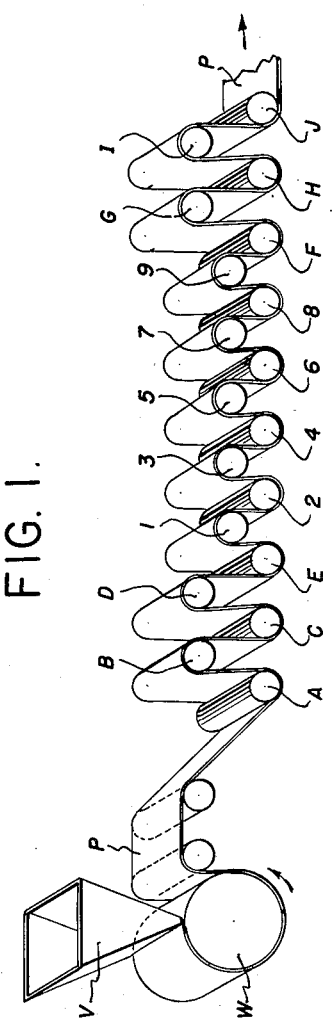
INVENTORS
ALBERT HERSHBERGER
& ARTHUR C. SCARLETT
BY
ATTORNEY.

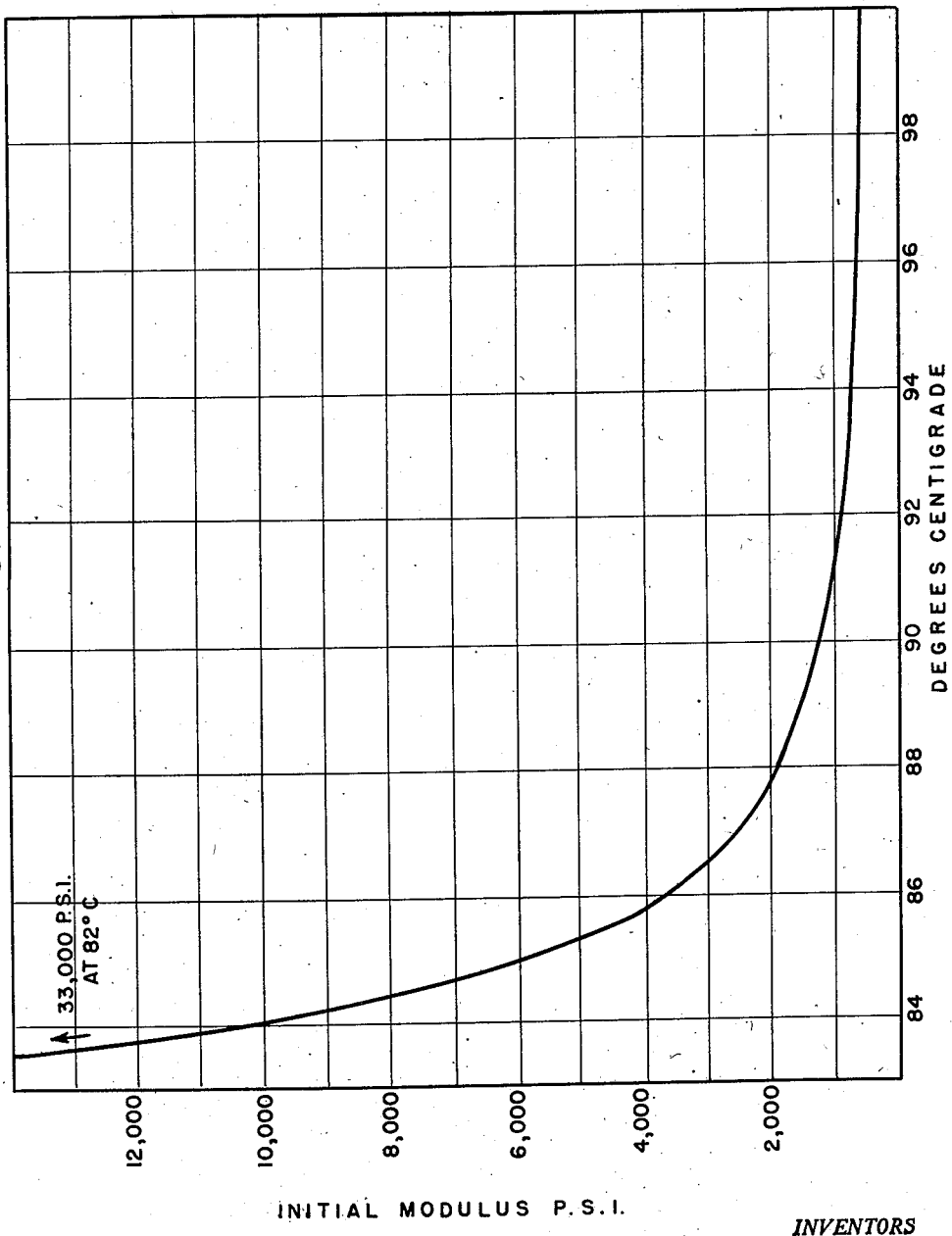

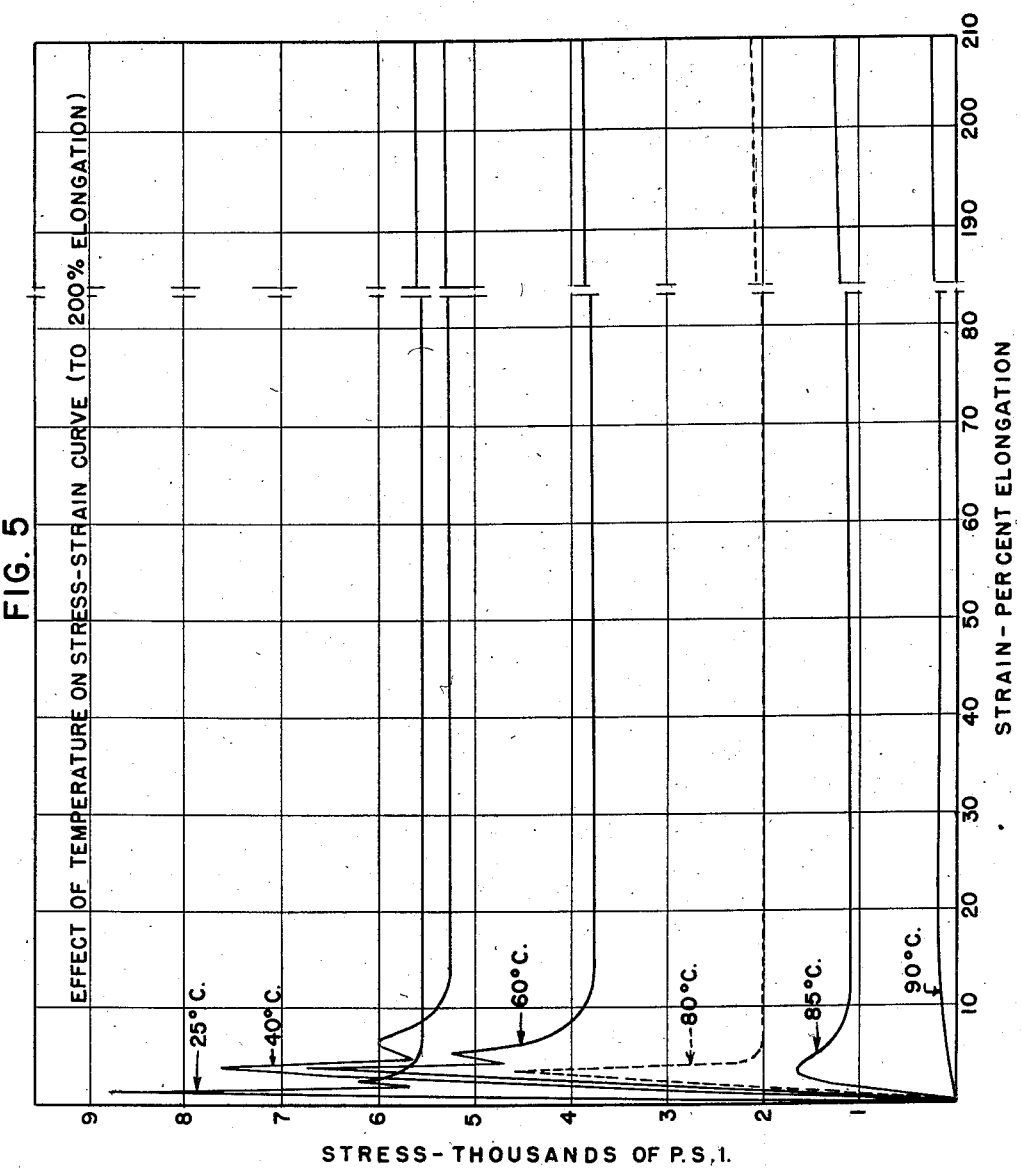

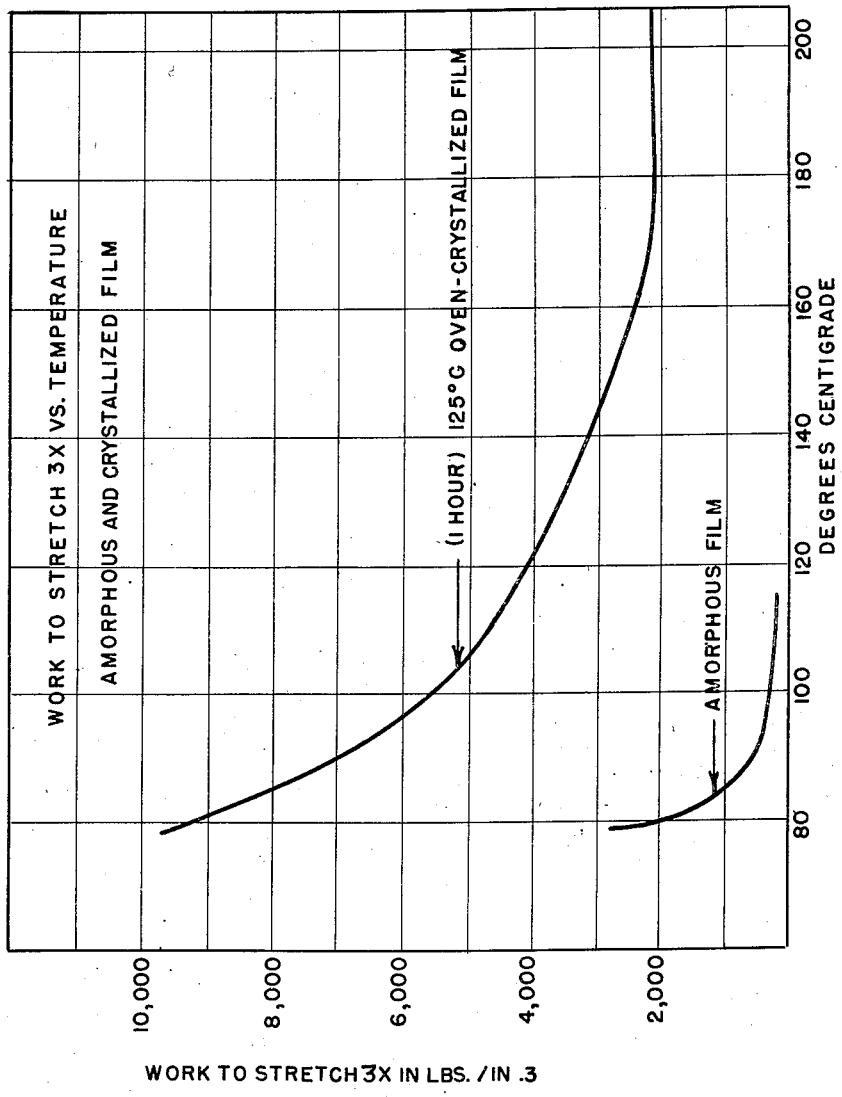

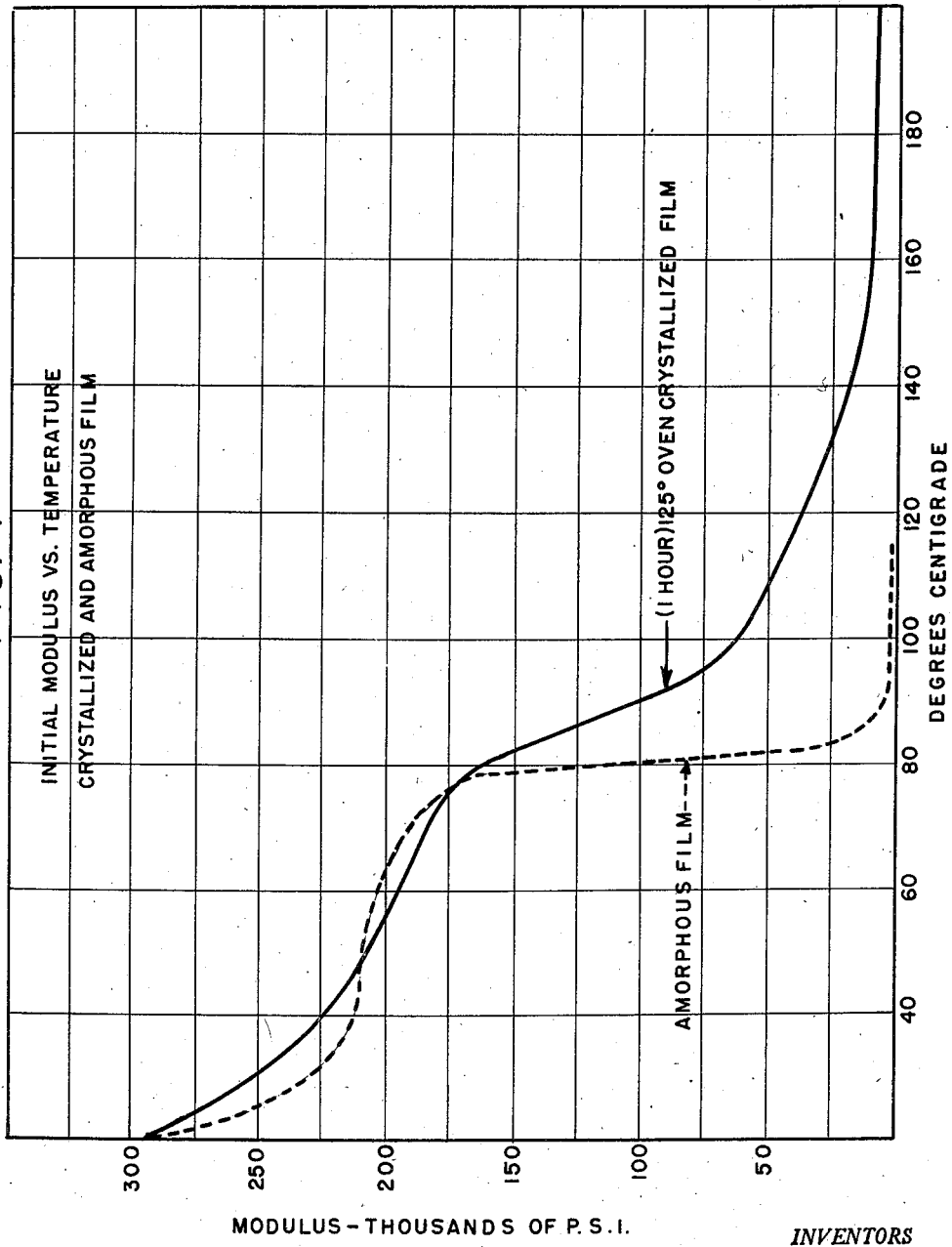

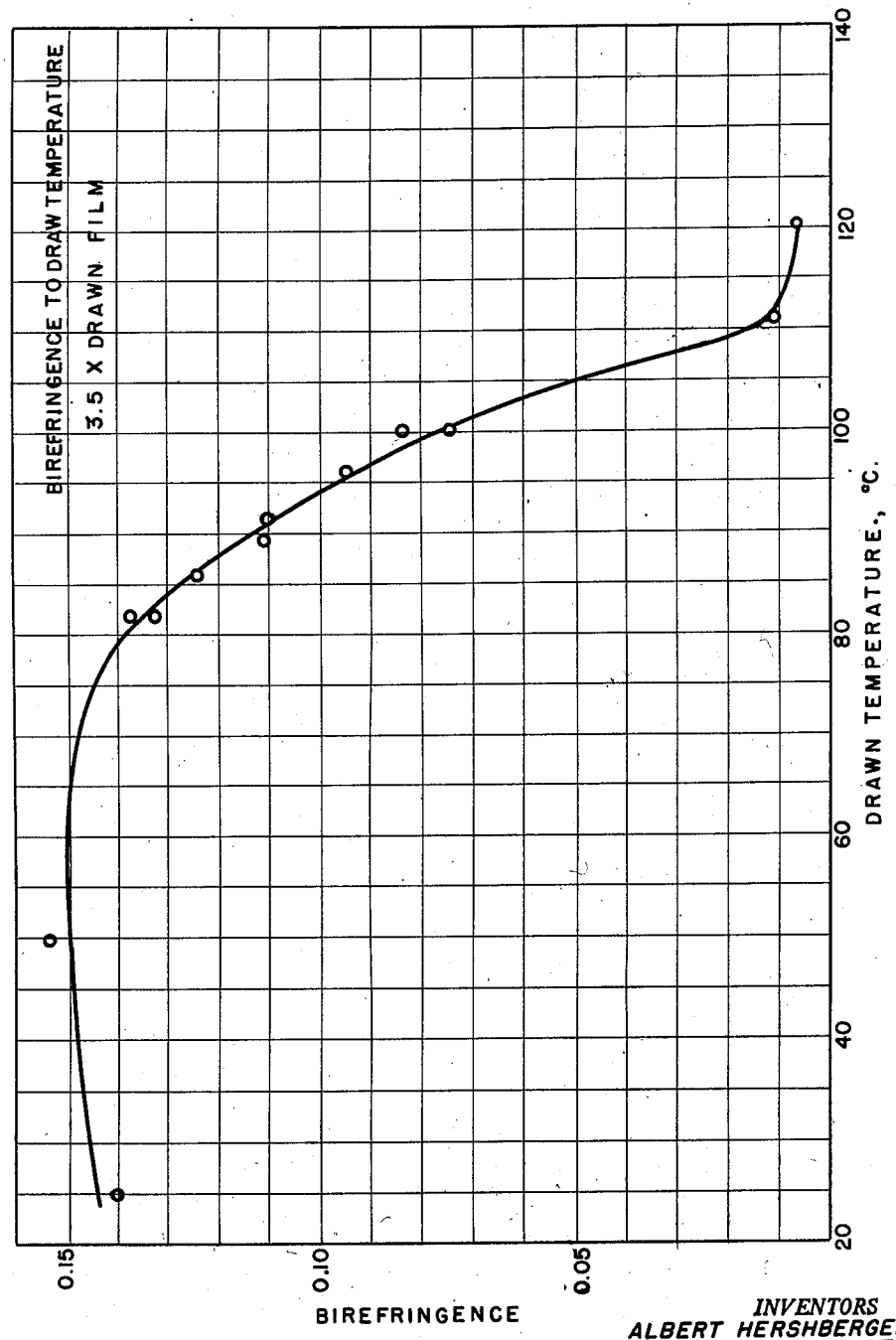

Feb. 18, 1958  A. C. SCARLETT  2,823,421
STRETCHING OF POLYETHYLENE TEREPHTHALATE FILM
Filed May 12, 1952  16 Sheets—Sheet 8
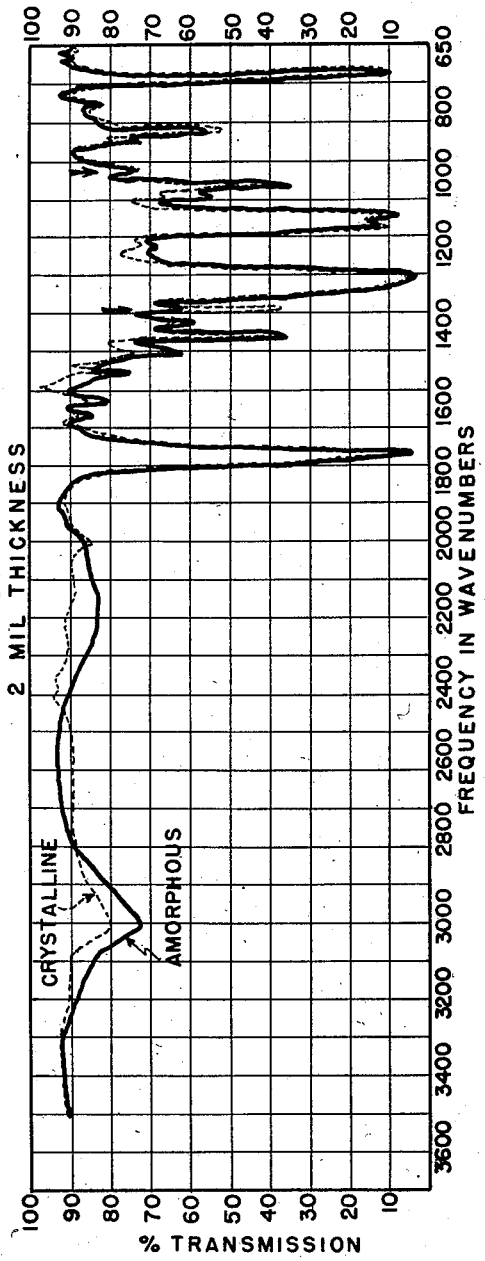
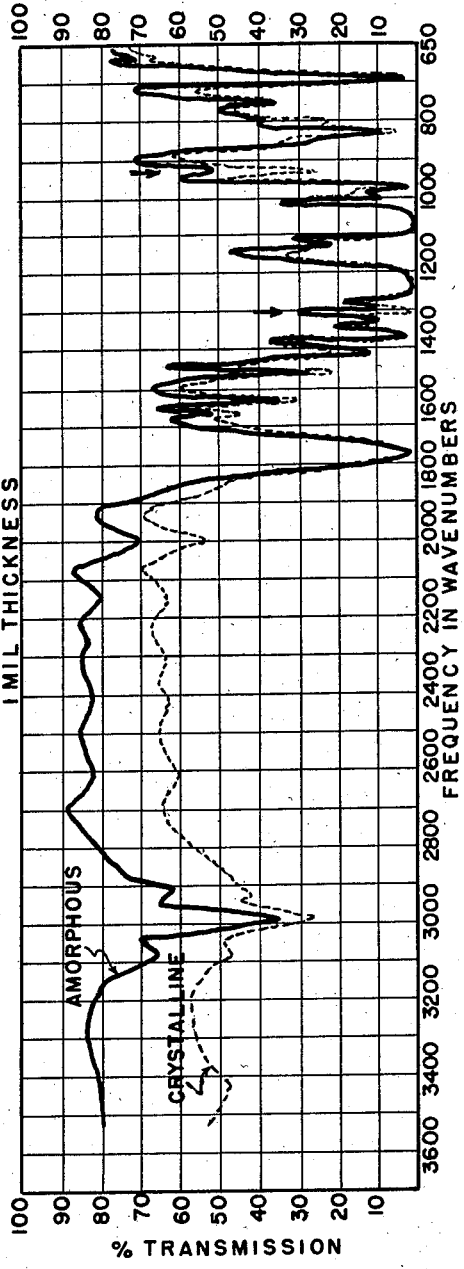
INVENTORS
ALBERT HERSHBERGER
& ARTHUR C. SCARLETT
BY
ATTORNEY.

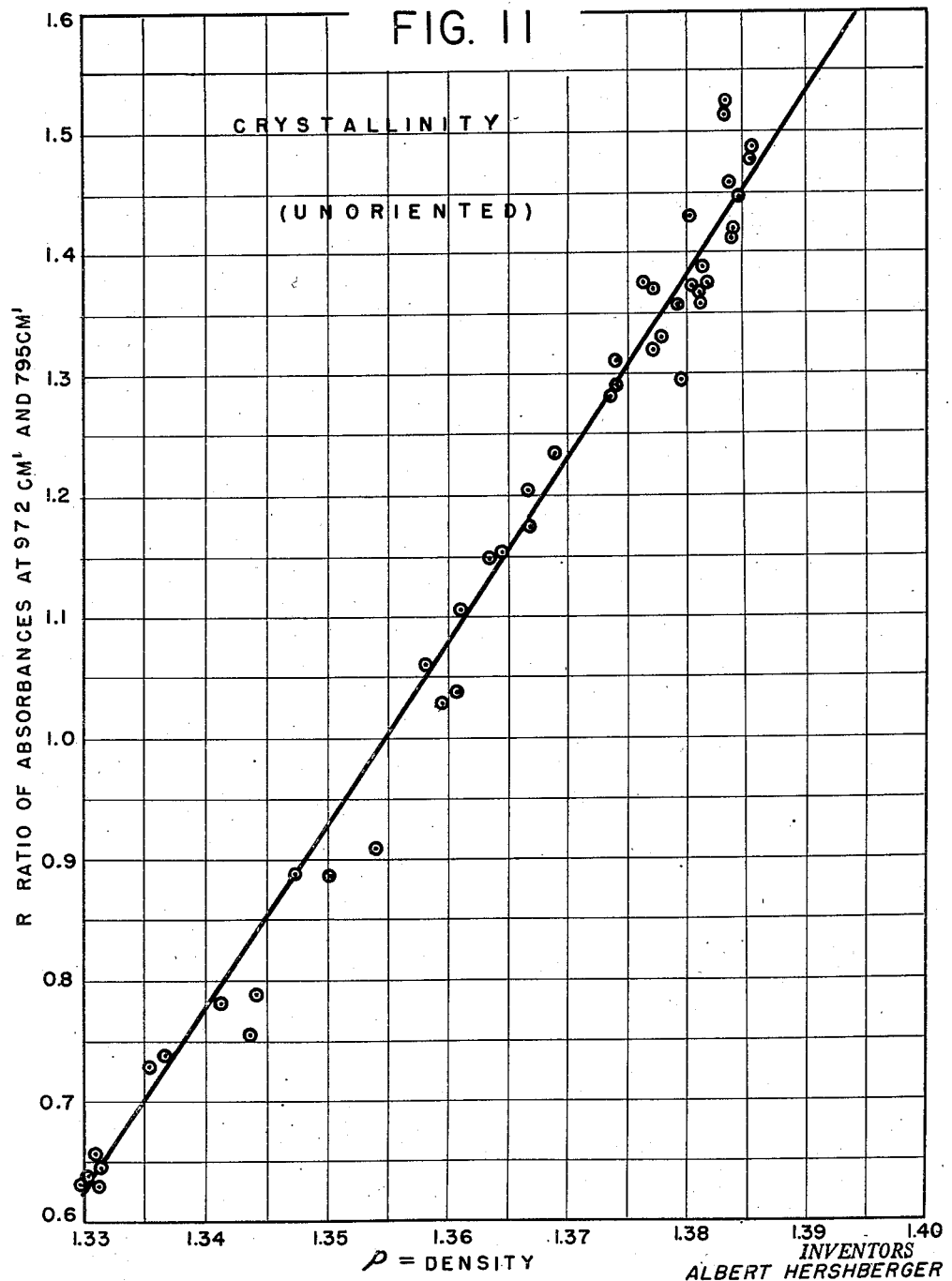

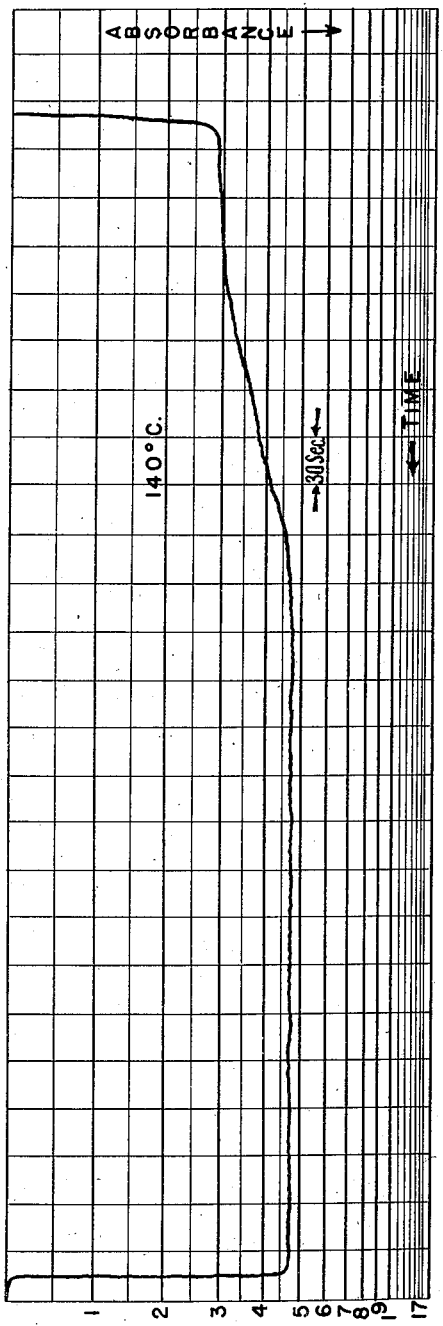

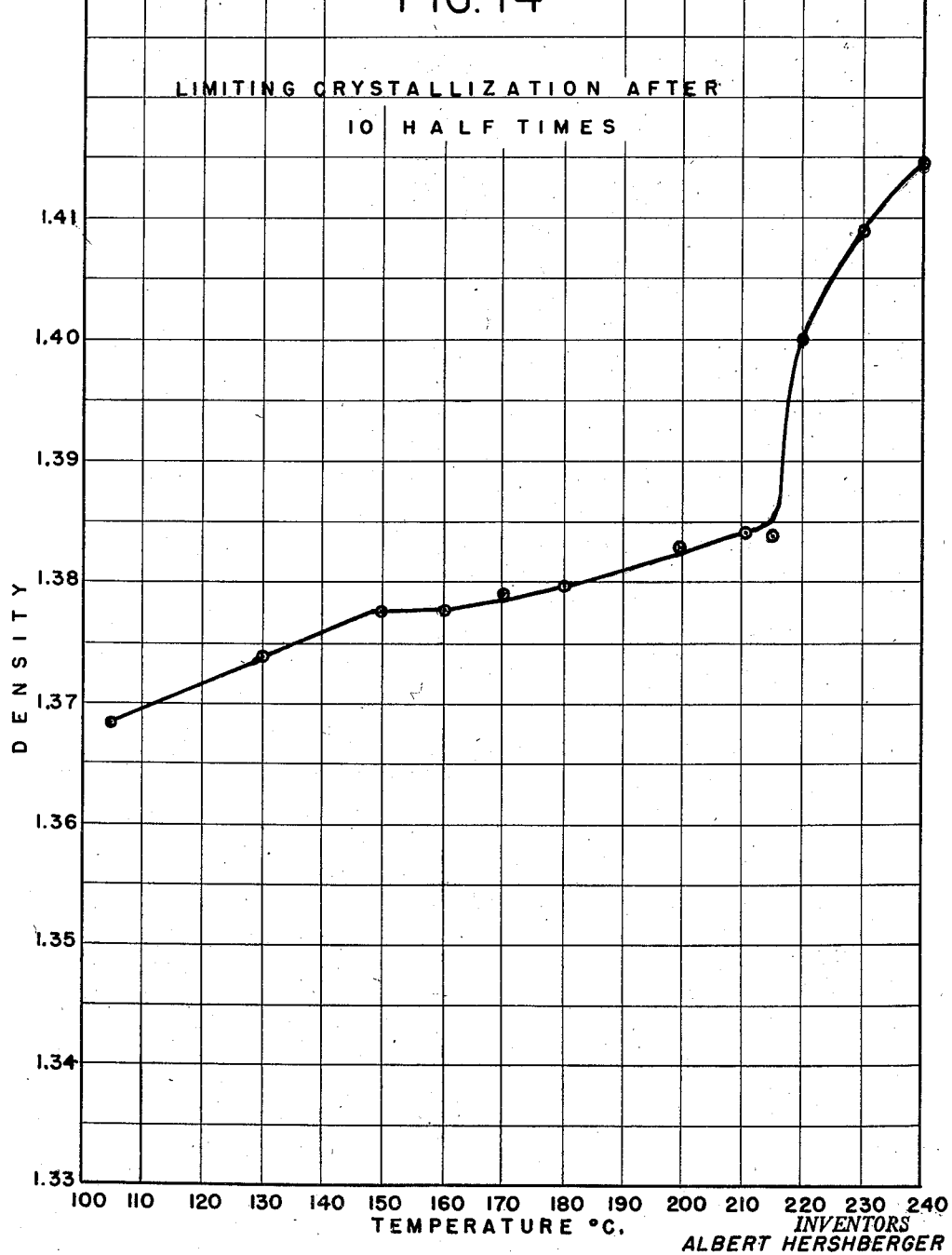

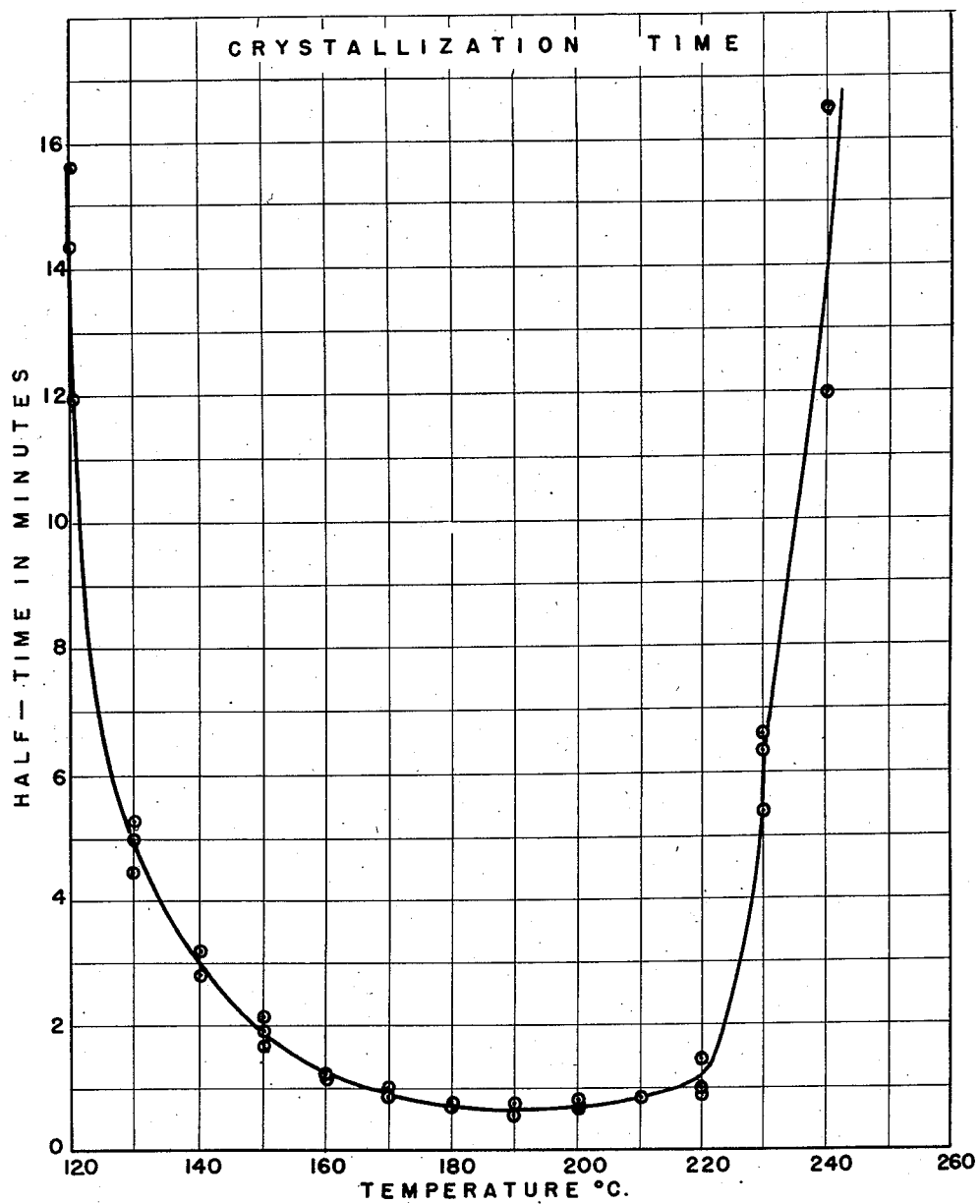

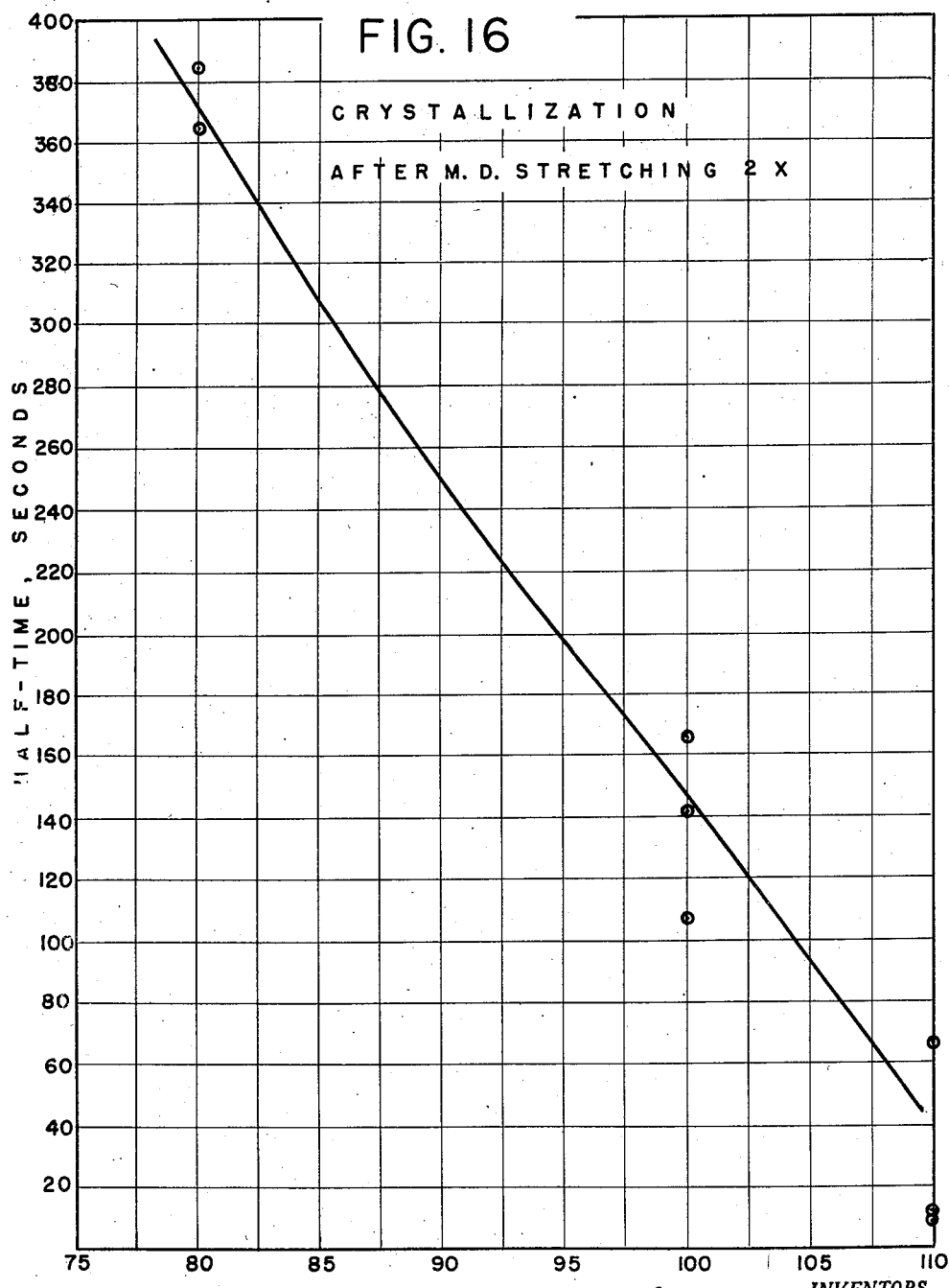

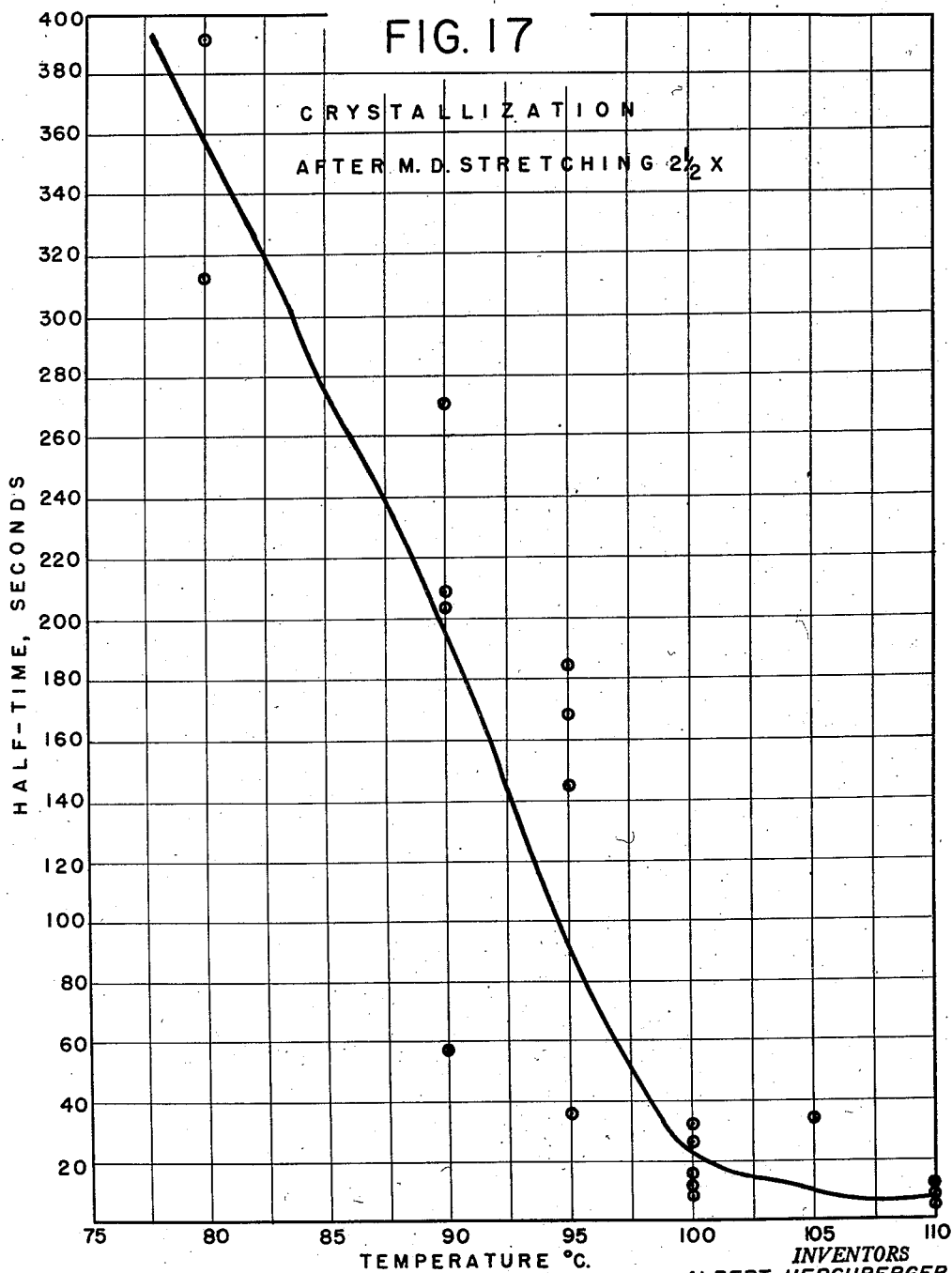

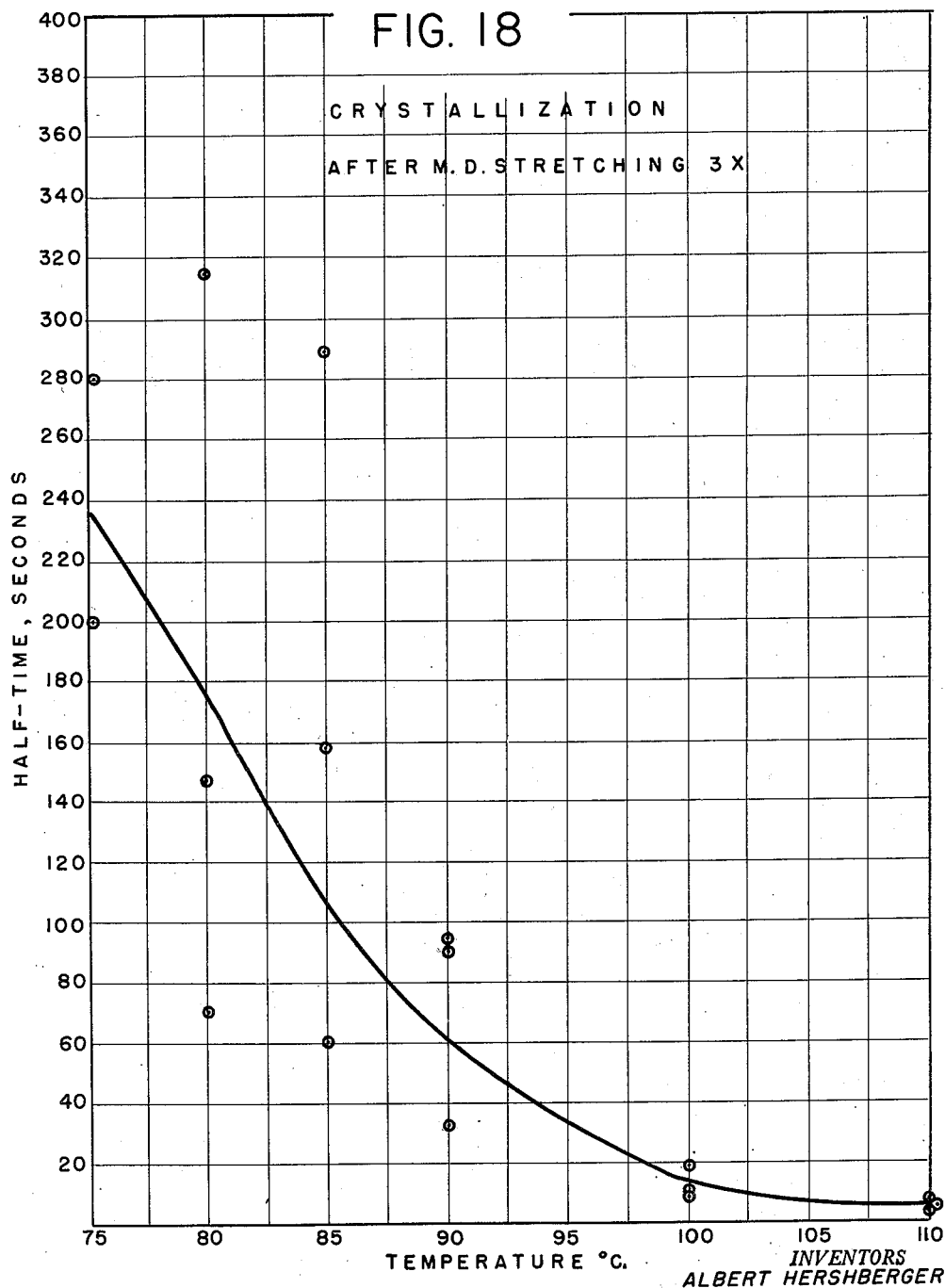

United States Patent Office 2,823,421
Patented Feb. 18, 1958

2,823,421

STRETCHING OF POLYETHYLENE TEREPHTHALATE FILM

Arthur C. Scarlett, Buffalo, N. Y., assignor to E. I. du Pont de Nemours and Company, Wilmington, Del., a corporation of Delaware Application May 12, 1952, Serial No. 287,354

6 Claims. (Cl. 18—57)

This invention relates to a process of improving the physical properties of a polyester film, and, more particularly, to a process of improving the physical properties of polyethylene terephthalate film by stretching.

Polyethylene terephthalate, described and claimed in U. S. P. 2,465,319 to Whinfield and Dickson, may be prepared by the condensation of ethylene glycol and terephthalic acid, or, preferably, by carrying out an ester interchange reaction between ethylene glycol and a dialkyl ester of terephthalic acid, e. g., dimethyl terephthalate. Films of polyethylene terephthalate may be prepared by extruding the molten polymer through a narrow orifice and chilling the polymer in film form. The opening of the orifice is adjusted in accordance with the caliper desired. Such film inherently has a number of excellent physical properties which make it useful in a great variety of applications, e. g., packaging, electrical applications as a dielectric, protective coverings, glass replacement, etc. However, certain physical properties, such as tensile strength, impact strength, flex life, water vapor, and organic vapor permeability and tensile modulus are not competitive with those of other types of film compositions. This prohibits the wide use of unoriented polyethylene terephthalate film in many applications, especially in the electrical industry.

An object of the present invention, therefore, is to produce a polyethylene terephthalate film having an outstanding combination of physical, chemical and electrical properties. A further object is to produce a polyethylene terephthalate film having substantially equivalent mechanical properties as measured in both the machine and transverse directions. A further object is to provide a process of biaxially stretching polyethylene terephthalate film. A still further object is to provide a process of biaxially stretching polyethylene terephthalate film continuously at appreciable stretching rates. Other objects will be apparent from a further description of the invention hereinafter.

The above objects are accomplished according to the present invention by extruding molten polyethylene terephthalate to form an amorphous film and thereafter continuously longitudinally stretching the film at least at the rate of 400% per minute no greater than 3.25 times (3.25×) at a temperature between 80°–90° C., preheating the longitudinally stretched film at a temperature between 90°–95° C., continuously transversely stretching the film substantially the same amount at at least 400% per minute at a temperature within the range 95°–110° C. to produce a balanced film, and thereafter heat-setting the biaxially stretched film at a temperature within the range 150°–250° C. It is to be understood that the above temperatures represent those to which the film is subjected, i.e., the environment about the film. Owing to the heat of stretching generated within the film, the actual temperature of the film at any time during the process is usually higher than the temperature of its immediate environment.

Conventional film extrusion apparatus and conventional apparatus designed to stretch continuous web material longitudinally and transversely may be used to carry out the process of the invention hereinabove outlined. A convenient arrangement of apparatus particularly adapted to the practice of the present process will now be described with reference to Figures 1 and 2 of the accompanying drawings wherein are illustrated diagrammatically the arrangement of film casting and longitudinal stretching apparatus (Fig. 1), and the transverse stretching and heat-setting apparatus (Fig. 2). The remaining figures of the drawing, viz., Figs. 3 to 18 inclusive, are graphs illustrative of critical conditions which characterize the process of this invention.

Referring to Figures 1 and 2, molten polyethylene terephthalate is extruded at a temperature of 270°–315° C. through a narrow slot orifice of hopper V vertically downward onto a cool drum W maintained at 60°–80° C. The linear speed of the surface of the drum is in the neighborhood of 1.5–10 times faster than the linear rate of extrusion of the film. After setting, the film P, which is about 20" wide, is continuously stretched longitudinally and then transversely in an apparatus essentially composed of two main parts, namely, a longitudinal stretching section and a transverse stretching section. The longitudinal stretching section is composed of 19 horizontal rolls in parallel arrangement and lying in different vertical and horizontal planes. The first five rolls, A–E inclusive, are positively driven "slow" rolls; the next 9 rolls, 1–9 inclusive, are closely spaced idler rolls and not positively driven; and the last 5 rolls, F–J inclusive, are positively driven "fast" rolls. Actual stretching is carried out over the idler rolls, and the extent of longitudinal stretch is determined by the difference in linear speed of the positively driven slow rolls and fast rolls. All of the rolls are internally heated (by any conventional expedient, not shown) and maintained within the range 80°–90° C., and usually within the range 85°–90° C. In the specific apparatus employed to illustrate the process of the present invention, the length of film actually in the stretching rolls at all times is about 21′. This length is distributed over the slow rolls, idler rolls and fast rolls as follows: 6′, 9′ and 6′, respectively.

The transverse section of the stretching apparatus is essentially divided into four zones. The entire section is composed of a tenter frame having a chain of tenter clips on both sides of the film. As the film emerges from the longitudinal stretching section, it is directed between parallel rows 10 and 11 of tenter clips; and the tenter clips grasp the edges of the longitudinally stretched film and move outward to stretch the film transversely. The first zone is represented by the distance from the end of the longitudinal stretching section to the point where transverse stretching is begun. Although this zone serves to maintain substantially the temperature of the film as it emerges from the longitudinal stretching section, it will be hereinafter referred to as the preheating zone. This zone is about 10′ in length and the temperature is within the range 90°–95° C. The second zone represents the section between the beginning and end of transverse stretching. This zone is 20′ in length, and the temperature is maintained within the range 95°–110° C. The third zone will be referred to hereinafter as the "heat-setting" zone in which the film, as it passes through the housing 12, is subjected to an elevated temperature within the range 150°–225° C., while the film is maintained under transverse tension. The heat-setting zone is 20′ in length. The final zone of the transverse stretching section is open to the atmosphere and serves to cool the film gradually. This zone is 10′ in length.

The molten polyethylene terephthalate must be cast under conditions such that the formed film, when set, is substantially amorphous (non-crystalline). This is most conveniently accomplished by extruding the melt, as just described, onto a casting drum maintained at a temperature sufficiently low to effect rapid quenching or chilling of the polymer from the molten state. The film remains substantially amorphous up to the point of longitudinal stretching. Thereafter, the rate of crystallization increases as the film is subjected to stretching at elevated temperatures, and it is the rate of crystallization in combination with the degree of orientation which influences the conditions of the biaxial stretching process of the present invention. Generally, as a film becomes more crystalline, i. e., increases in density, the work required to stretch the film greatly increases in contrast to the work required to stretch a substantially amorphous film.

In continuously biaxially stretching polyethylene terephthalate film in an apparatus of the type described, the film is preferably stretched at rates of at least 400% per minute and, generally, within the range from 1,000–1,500% per minute. Obviously, in a continuous process, the highest rates are desirable in order to obtain a high rate of film production and stretching rates as high as 2,000–4,000% per minute may be used in the present process. Hence, the process of the present invention defines the critical conditions for obtaining biaxially oriented polyethylene terephthalate film having the optimum combination of physical, chemical and electrical properties at high stretching rates. In the stretching apparatus described hereinbefore, a stretching rate of 400% per minute is equivalent to about 15 yards per minute, whereas a stretching rate of 2,000% per minute corresponds to about 100 yards per minute in the specific apparatus described herein.

The critical temperature limitations of the biaxial stretching process of the present invention are governed mainly by three points of consideration, namely: (1) efficiency of orientation, (2) work required to stretch, and (3) rate of crystallization of the polyester film. As a general requirement for continuous stretching of polyethylene terephthalate film at appreciable rates, i. e., at least 400% per minute, longitudinal stretching[1] must be carried out at a temperature of at least 80° C.; and the transverse stretching step must be carried out at a somewhat higher temperature than that of the first direction step in order to maintain the work of stretch at a minimum and avoid film breakage. This minimum temperature is established by observing the temperature at which a discontinuity occurs in the curve of a first derivative thermodynamic quantity of the polymer with temperature. This may be observed from a plot of density, linear expansion, specific volume, specific heat, sonic modulus, initial modulus or index of refraction against temperature. Figure 3 contains a plot of initial modulus vs. temperature in which is shown the change in the direction of the curve occurring at a temperature in the neighborhood of 85° C. Generally, depending upon the intrinsic viscosity of the polymer, the minimum temperature above which the first direction stretching is carried out is within the range 80°–85° C. Hence, as will be illustrated hereinafter, the first direction or longitudinal stretch must be carried out at a temperature within the range 80°–90° C. so that the work required to stretch the film is at a substantial minimum; and at this temperature, the film draws homogeneously over the entire area of the film under tension. Furthermore, the second direction or transverse stretch must be carried out at a temperature somewhat greater than that at which the film is stretched longitudinally. This is because the film is oriented in the machine direction, which produces a stronger film; and with crystallization taking place, the amount of work required for stretching in the second direction is increased. Hence, by carrying out the second direction stretch at higher temperature, i. e., 5°–20° C. higher, the work required for stretching is maintained at a minimum.

For the purpose of further considering the behavior of polyethylene terephthalate film upon stretching, reference is had to Figure 4 which represents a stress-strain diagram for amorphous polyethylene terephthalate film, this diagram embodying a number of definitions which will be referred to hereinafter. The plot of Figure 4 begins with a steep straight line where the stress is proportional to the strain. This ratio at low elongations is termed the initial modulus M and is a measure of film stiffness. The sudden change in direction of the curve is called the yield point, YP, which is located by reference to the tension and elongation at that point. Frequently, a second smaller peak occurs which is termed the secondary yield point, $YP_2$. Beyond this point, the film elongates with little or no increase in tension. The lowest tension level of the region is called the stretching force, SF. The point at which the film begins to offer resistance to stretching is called reinforcing point, RP. Finally, at the end of the curve is the tensile strength T, and breaking elongation, E. The area under the curve is representative of the work of stretching, WS.

In order to ascertain the work required to stretch amorphous polyethylene terephthalate film at various temperatures below 80° C., a series of stress-strain diagrams were plotted to obtain these data. Figure 5 is a series of stress-strain diagrams at temperatures ranging from 25° to 90° C. Table 1 is a tabulation of the data employed to plot the diagrams of Figure 5, including the various data obtained from the plots.

TABLE 1

*Effect of temperature on stress-strain properties of amorphous unstretched polyethylene terephthalate*

| Temp., ° C. | Modulus, p. s. i. | Yield Point Tension, p. s. i. | Stretch Force, p. s. i. | Work to Stretch 3 × (in lbs./in.³) |
| --- | --- | --- | --- | --- |
| 25 | 280,000 | 8,800 | 5,600 | 12,000 |
| 40 | 208,000 | 7,600 | 5,200 | 10,700 |
| 50 | 208,000 | 6,800 | 4,700 | |
| 60 | 208,000 | 6,200 | 4,000 | 7,500 |
| 66 | 196,000 | 4,000 | 2,500 | |
| 74 | 160,000 | 2,400 | 1,230 | |
| 80 | 66,000 | 1,440 | 685 | 872 |
| 85 | 13,000 | 650 | 650 | 530 |
| 90 | 1,000 | 200 | 200 | 320 |
| 95 | 960 | 150 | 150 | |
| 100 | 820 | 160 | 130 | |
| 120 | 450 | 60 | | |

As shown in the stress-strain diagrams of Figure 5, amorphous polyethylene terephthalate film does not draw homogeneously at temperatures below 80°–85° C. This means that when tension is applied longitudinally, drawing takes place from a transverse line and is not effected uniformly over the entire surface of the film. This is indicated in the stress-strain diagrams at 25° C., 40° C. and 60° C., wherein there is the appearance of a secondary yield point, the tension increasing almost linearly to a high load value, suddenly decreasing about 25% and then increasing sharply a second time and finally decreasing to some constant level at which it elongates with little or no change in load. This secondary yield point is believed to be due to the formation of a second line of drawing. Furthermore, Table 1 clearly shows the minimum amount of work required to stretch amorphous polyethylene terephthalate film at temperatures within the range 80°–90° C.

In contrast with the work required to stretch a crystallized unstretched polyethylene terephthalate film, a sample of an amorphous film was exposed to a temperature of 125° for one hour to effect crystallization. Figure 6

---

[1] The term longitudinal stretching will be used herein to mean the direction in which the film is stretched first, and transverse stretching will be referred to as the second direction stretch. Obviously, the film could be stretched first in the transverse direction and then in the longitudinal or machine direction; but when employing rolls to stretch the film longitudinally, the rolls would have to be excessively long if the film were first stretched transversely.

contains plots which show comparison of the work required to stretch amorphous film with that required to stretch a crystallized film. Figure 7 compares the course of initial modulus with temperature for the amorphous and crystalline films.

Table 2 contains a tabulation of the same type of data for crystallized polyethylene terephthalate film as presented in Table 1 for amorphous film.

TABLE 2

*Effect of temperature on stress-strain properties of crystallized unstretched polyethylene terephthalate*

| Temp., ° C. | Modulus, p. s. i. | Yield Point, p. s. i. | Stretch Force, p. s. i. | Work to Stretch 3× (in lbs./in.³) |
|---|---|---|---|---|
| 20 | 300,000 | 9,000 | | |
| 40 | 225,000 | 6,800 | | 10,000 |
| 60 | 195,000 | | | |
| 80 | 168,000 | 6,000 | | 9,450 |
| 90 | 105,000 | 4,900 | | 7,500 |
| 100 | 61,000 | 3,000 | 2,500 | 5,500 |
| 125 | 36,000 | 2,200 | 2,000 | 4,000 |
| 142 | 16,000 | 1,000 | | |
| 165 | 8,000 | | | 2,200 |
| 197 | 8,000 | | | 2,000 |

In the first direction (longitudinal) stretching step of the process of the present invention, the foregoing discussion has been devoted to considering the effect of temperature on the work required for stretching the polyester film, 80°–90° C. being optimum for stretching amorphous film. The efficiency of orientation at various stretching temperatures is also a critical factor with respect to producing a biaxially stretched film having the optimum combination of physical, chemical and electrical properties. Various techniques may be employed to measure orientation of the polyester film such as X-ray diffraction, polarized infrared absorption, swelling in water, heat shrinkage, comparison of MD (machine direction) and TD (transverse direction) physical properties such as tenacity or elongation, and measurement of birefringence. For measuring orientation of polyethylene terephthalate film, the measure of birefringence was selected. Birefringence is a dimensionless number and is a direct measure of the difference of the refractive indices of the film parallel to and perpendicular to the axis of orientation. When a birefringent film such as oriented polyethylene terephthalate transmits a beam of plane polarized light which strikes perpendicular to the axis of orientation (normal to the plane of the sheet, for example), the line is split into two beams polarized at right angles to each other, one of which travels faster than the other. The distance that one of these beams is ahead of the other when they emerge from the film is known as the retardation of the sample (usually expressed in millimicrons) and is related to the film thickness and to birefringence, $\Delta_n$, by the equation, $$\text{Retardation} = \text{thickness} \times \text{birefringence}$$

Thickness can be measured readily, and retardation is measured by means of a compensator such as a calibrated quartz wedge.

Since birefringence is a direct measurement of the degree of orientation, the orientation of samples of stretched polyethylene terephthalate has been measured at various draw temperatures by plotting birefringence vs. draw temperature from 25° C. up to 120° C. It is to be understood that the higher the value of birefringence, the greater the degree of orientation. Figure 8 is a plot of birefringence vs. draw temperature for a sample of polyethylene terephthalate film (0.002″ in thickness) which has been drawn 3.5× in one direction. The film samples were 6″ by 10″; and after drawing at the various temperatures indicated, the birefringence measurements were made upon center portions of the samples. Because the film could not be drawn successfully at the lower temperatures, the samples which were to be stretched at 25° and 50° C. were first heated for 15 seconds at 120° C. and then air quenched to increase their drawability.

As shown in Figure 8, there is a rapid drop in efficiency of orientation as the temperature increases appreciably beyond 80°–85° C. Hence, in conjunction with the foregoing considerations with respect to the amount of work required to stretch the amorphous polyester film, a temperature within the range 80–90° C. is optimum for the first direction or longitudinal stretch. Preferably, the temperature is about 85° C.

In general, with respect to the temperature range within which polyethylene terephthalate film is stretched in the first or longitudinal direction, stretching at temperatures above 90° C. results in substantially no orientation. On the other hand, stretching at temperatures below 80° C. results in substantially non-uniform orientation in view of the fact that drawing takes place from various lines of demarcation; and stretching is not uniform over the entire cross-sectional area of the film.

With respect to stretching one-way stretched polyethylene terephthalate film in the transverse direction, the main factors to be taken into consideration are: (1) the work required to stretch the film in the second direction, and (2) the rate at which the film is crystallizing. Actually, these factors are directly connected because the more crystalline the film is, the greater is the work required to stretch in the second direction. Furthermore, the degree of orientation which has been imparted to the film after the first direction stretch also increases the amount of work required to stretch the film in the second direction. Hence, raising the temperature of the film during the second direction or transverse stretch serves to maintain the work required at a minimum in addition to reducing film breakage to a negligible degree.

General measurements of the density of a film stretched 3× in the longitudinal direction have indicated that the film is about 10–14% crystalline. Furthermore, after a polyethylene terephthalate film has been stretched 3× in both directions, it is about 20–25% crystalline; and the heat-setting step in the neighborhood of 200° C. produces a final film which is about 40–42% crystalline.

As polyethylene terephthalate film is exposed to increasing temperatures, crystallization is initiated; and the rate of crystallization increases as the temperature increases up to a temperature in the neighborhood of 200° C. As the temperature increases appreciably above 200° C., the rate of crystallization again decreases as at lower temperatures. Furthermore, the combination of exposure to elevated temperatures and stretching in one or both directions further increases the rate of crystallization of the polyester film.

In the past, density changes have been used to measure the crystallinity of various polymer systems. For example, amorphous unstretched polyethylene terephthalate film has a density at 30° C. of 1.331 gms./cc. X-ray studies give a density calculated from the dimensions of the triclinic unit cell as 1.47 gms./cc. for the theoretically pure crystalline polymer. Polymer having a density between 1.331 and 1.47 exhibits varying degrees of crystallinity. For the purpose of measuring rapid changes in the crystallinity of polyethylene terephthalate, the measurement of density is inadequate. In order to follow the rapid changes in the crystallinity of unstretched and stretched polyethylene terephthalate film upon exposure to elevated temperatures, infrared absorption measurements have been employed. The infrared absorption was correlated quantitatively with the density of polyethylene terephthalate for varying degrees of crystallinity, and qualitatively with the change in X-ray diffraction pattern with crystallization of the polyester. Samples of polyethylene terephthalate films 0.002″ and 0.001″ respectively, in thickness were employed. Infrared spectra and X-ray diffraction patterns were obtained on the film samples before and after heat treatment for ¾ of an hour at 195° C. Figures 9 and 10 show the comparative results. The frequency of light waves in terms of the number of such waves occurring in one centimeter length is called the wave number and is measured in reciprocal centimeters abbreviated cm.$^{-1}$. Figure 9 illustrates the wide difference in percent transmission of infrared at the frequencies, 1340 cm.$^{-1}$ and 972 cm.$^{-1}$. For the purpose of following the course of crystallization, the latter frequency was chosen for use because it presented less possibility of interference by variation in the absorption due to water vapor in the atmosphere. Figure 10 shows an X-ray diffraction pattern of the amorphous film and the crystalline film (after heat treatment for ¾ of an hour at 195° C.).

Since density changes have been used for measuring crystallinity, the change in infrared absorption at a frequency of 972 cm.$^{-1}$ was correlated with change in density. In Figure 11, the optical density at 972 cm.$^{-1}$ divided by that at 795 cm.$^{-1}$ is plotted for films of varying density. The optical density at 795 cm.$^{-1}$ was not appreciably influenced by crystallization, and division by it served to allow elimination of the thickness variable with the samples used. The infrared measurements were made at 25° C. The varying densities were obtained by progressive heat treatments. The densities were measured in a density gradient tube using heptane and carbon tetrachloride at 30° C. and are known to ±0.001 gram per cc. The straight line of Figure 11 shows proportionality between optical density and density for the crystallization process.

The apparatus employed for obtaining isothermal crystallization time curves was a standard Perkin-Elmer model 12–C infrared spectrometer with sodium chloride optics. In the center was an insulated duct for air leading from heaters below to the insulated sample compartment between the instrument housings. A blower provided forced circulation in the system. A thermocouple inserted in the air stream in the sample compartment leads to a recorder-controller. The controller served to keep the temperature in the sample compartment constant to ±1° C. by control of an appropriate amount of the electrical heating available from the air heating chamber located below. Suitable baffles of copper sheet prevented overheating of the spectrometer proper. A small housing on top of the sample compartment served as an air lock for very rapid introduction of the sample into the light beam of the spectrometer by gravity fall. A sample holder of low heat capacity may be seen placed against the instrument casting at the extreme left. The sample holder is of a size sufficient to make the temperature of the part of the thin film sample in the light beam independent of that of the holder metal itself. In use, the sample holder was placed in the air lock chamber; a sliding door allowed the holder to fall suddenly into supporting ways within the main sample compartment. The ways are situated so that free air circulation is provided around the sample and the latter is reproducibly positioned in the light beam. Sodium chloride windows allow the light to pass through the sample compartment.

To obtain crystallization time curves, the apparatus was first brought to temperature equilibrium at the temperature chosen for measurement. A crystallized sample was introduced into the beam, and the monochrometer was carefully adjusted to the frequency of the minimum of the absorption band at 972 cm.$^{-1}$. The slit-width used was 0.200 mm., giving a resolution of about 4 cm.$^{-1}$ and a signal to noise ratio such as to allow determination of optical density to approximately 0.005 unit. The trial sample was removed, and the recording system of the spectrometer adjusted for zero and infinite optical density on the logarithmic chart paper. The time travel or axis of the chart was started. The sample for measurement was chosen to give optical densities ranging from about 0.3 to 0.5; about 0.001 inch was the proper thickness. It was placed in the holder and introduced into the air lock. The sliding door was operated; the sample dropped suddenly in free fall into the holding ways below. The passage of the holder through the beam served to mark zero time on the chart record. The thin film is estimated to reach the temperature of measurement in less than a second. The amorphous optical density recorded initially after fall to the rest position increased as crystallization progressed, finally tapering off to a limiting value characteristic of the crystallized sample. Figure 12 is a typical experimental record obtained in this manner at 140° C.

For crystallization measurements, all samples were taken from the same lot of polymer in the form of a cast film of 0.001″ thickness. The intrinsic viscosity was about 0.61, and the polymer was cast from a melt at about 300° C. and quenched to room temperature. No evidence of the presence of crystallinity could be obtained in this material by X-ray examination or by measurement of the density even one year after it was cast.

Several samples of film were crystallized and the crystallization curve of each recorded at temperatures from 120° C. to 240° C. The continuously determined data for one curve at each temperature are plotted in Figure 13. In this figure, the curves start at different optical densities because the absorption is taking place at different temperatures and because the samples varied in thickness initially. Table 3 summarizes the half-times for crystallization to the observed limiting values at various temperatures and includes several measurements at each temperature. The limiting values of density of polyethylene terephthalate at various temperatures were obtained by maintaining the film at the given temperature for a period equivalent to 10 half-times.

TABLE 3

Crystallization of polyethylene terephthalate

| Temperature, ° C. | Half-Time | |
|---|---|---|
| | Min. | Sec. |
| 120 | 14 | 19 |
| | 15 | 38 |
| 130 | 11 | 56 |
| | 4 | 26 |
| | 5 | 2 |
| 140 | 5 | 13 |
| | 3 | 12 |
| | 2 | 48 |
| 150 | 3 | 9 |
| | 1 | 47 |
| | 1 | 55 |
| 160 | 2 | 4 |
| | 1 | 13 |
| | 1 | 16 |
| 170 | 1 | 16 |
| | 1 | 2 |
| | | 57 |
| 180 | | 60 |
| | | 47 |
| | | 39 |
| 190 | | 44 |
| | | 44 |
| | | 38 |
| 200 | | 47 |
| | | 41 |
| | | 50 |
| 210 | | 44 |
| | | 42 |
| | | 54 |
| | 1 | 51 |
| 220 | 1 | 9 |
| | | 54 |
| | 1 | 10 |
| | 1 | 27 |
| 230 | 1 | 1 |
| | | 54 |
| | 9 | 44 |
| | 5 | 25 |
| 240 | 6 | 38 |
| | 6 | 25 |
| | 16 | 33 |
| | 11 | 56 |

The density of unstretched polyethylene terephthalate film after 10 half-times at various temperatures is recorded in Figure 14.

The half-times for crystallization in Table 3 were plotted against temperature, and the course of crystallization time for unoriented (unstretched) polyethylene terephthalate film is indicated in Figure 15. As indicated, the crystallization times decreased to a minimum in the neighborhood of 190° C., and thereafter the times increase as the temperature approaches the melting point of 267° C.

Similar studies of infrared absorption of one-way stretched (oriented) polyethylene terephthalate film at various elevated temperatures indicate that the rate of crystallization appreciably increases as the amount of stretch or degree of orientation increases. Figures 16, 17 and 18 clearly illustrate the rapid increase in rates of crystallization as the degree of orientation or amount of stretch increases.

Figure 16 illustrates the course of half-time for crystallization of polyethylene terephthalate film stretched 2× longitudinally. Figures 17 and 18 show the same for polyester films stretched 2.5× and 3× respectively.

Under the temperature conditions of the present invention, attempts to form a balanced film stretched to an extent greater than about 3.25× in both directions (at stretching rates of at least 400%/minute) resulted in film breakage, owing to the high rate at which crystallization is taking place when the film is stretched greater than about 3.25× in the first or longitudinal direction. As pointed out hereinbefore, the temperature conditions for the second direction stretch must be higher than the temperature for the first or longitudinal stretch because the film is not only oriented, but crystalline. Hence, the work required to stretch the film must be maintained at a minimum by employing an increased temperature. In stretching a polyethylene terephthalate film greater than 3.25× in the longitudinal direction, the rate at which crystallization is taking place increases above the rate for films stretched 3×, as illustrated in Figure 18. Hence, in order to produce a balanced film at practical continuous stretching rates, i. e., at least 400% per minute, the film cannot be stretched greater than 3.25× in the first or longitudinal direction because film breakage will occur in attempting to stretch the film to an equivalent extent in the transverse direction even under the optimum temperature conditions specified.

Temperatures appreciably above 110° C. for transverse stretching promote excessively rapid crystallization, thereby increasing the amount of work required to stretch the film in the transverse direction, in addition to increasing the liability of film breakage. Furthermore, at the point of transverse stretch, there is appreciable amorphous polymer present in the longitudinally stretched film. Transverse stretching at temperatures above 110° C. results in elongation without appreciable orientation, this behavior being similar to the behavior of substantially completely amorphous unstretched polymeric film upon stretching at temperatures above 90° C. in the longitudinal direction. Hence, the temperature range 95°–110° C. is critical for the purpose of producing a balanced film which is biaxially oriented to the point of "uni-planarity;" e. g., this type of orientation is analogous to a group of pencils lying on a table top with the longest direction parallel to the surface and all trade marks facing up, but with no other uniform arrangement.

Measurement of the heat-aging characteristics of biaxially oriented polyethylene terephthalate film is useful to indicate that the polyester film must be oriented to an appreciable extent in order to resist embrittlement upon exposure to elevated temperatures up to 175° C. Experimental evidence indicates that oriented polyethylene terephthalate films stretched 2× biaxially and 2.5× biaxially, respectively (experiments conducted with 0.001" film), suffer from rapid reduction in elongation as compared with the minimum reduction in elongation experienced with 0.001" polyethylene terephthalate film stretched 3× biaxially. For example, after 250 hours of exposure at 175° C., the elongation of polyethylene terephthalate film stretched 2× biaxially drops about 83%, whereas the elongation of the film stretched 2.5× biaxially drops 53% compared with a 30% decrease in elongation of film stretched 3× biaxially. Furthermore, after 500 hours' exposure at 175° C., polyester films stretched 2× and 2.5× biaxially suffer a decrease in elongation amounting to about 98% and 92%, respectively, whereas the reduction in elongation of films stretched 3× biaxially amounts to only about 50% of the original elongation. The measurements employed to obtain these comparative figures were taken at 24° C. and 35% relative humidity. Such heat-aging characteristics, in combination with the initial superior physical properties of polyethylene terephthalate films stretched 3× biaxially, serve to establish a lower limit with respect to the degree of orientation required, as expressed in terms of extent of stretch. Hence, with respect to the use of polyethylene terephthalate film in general, electrical applications especially, a film stretched at least 2.5× biaxially and, preferably, 3× biaxially is outstanding with respect to all of the pertinent characteristics required for a good dielectric, i. e., electrical, physical and chemical properties and behavior of these properties under varying conditions of temperature, humidity, etc.

Biaxially oriented (stretched 3× in both directions), heat-set polyethylene terephthalate film produced in accordance with the process of this invention is about 40–42% crystalline, i. e., has a density from 1.39–1.40 grams per cc. Approximately ½ of the total amount of crystallization takes place during the heat-setting step, i. e., exposure for a short period of time to a temperature within the range 150°–250° C., while maintained under transverse tension. Crystallization of biaxially oriented film takes place rapidly at the temperatures preferred for heat-setting, i. e., in the neighborhood of 200° C. At 200° C., the crystallinity of biaxially stretched (3× in both directions) polyethylene terephthalate film may be increased from 20% to about 40% in a matter of 5–10 seconds. Since high stretching rates are desirable, the length of the heat-setting zone maintained at 200° C. of the apparatus described hereinbefore is so designed that adequate heat-setting is effected at the highest practical stretching rates. Generally, the preferred biaxially oriented balanced film for use in the greatest majority of the general packaging, electrical applications, etc. mentioned hereinbefore is one stretched 3× in both directions and heat-set in the neighborhood of 200° C. Produced by the present process, this film is in the neighborhood of 40% crystalline; the dichroic ratio is substantially 1; and the film is highly transparent. On the other hand, an unstretched film which has been crystallized to the extent of 40–42% is opaque. It should be understood that while a dimensionally stable film resulting from the heat-setting step is of wide general utility, there are many applications for a biaxially oriented heat-shrinkable film, e. g., as a protective covering for flash bulbs, and as heat-shrinkable bands, etc.

The present process is fully applicable to stretching polyethylene terephthalate of various thicknesses. In general, however, various problems of power requirements, efficient heat transfer, etc., come into play when attempts are made to stretch film of thicknesses substantially greater than 0.1". These problems are normally solved by proper equipment design.

The improved mechanical properties of balanced film are vividly illustrated in the case of very thin films, for example, from 0.0001"–0.0025". The toughness and general durability of these very thin films are highly outstanding, and films in the neighborhood of 0.00025" may be employed in a large number of light packaging and wrapping applications in addition to wide use as a dielectric as discussed in copending application U. S. Serial No. 287,345, filed May 12, 1952, in the name of Bernard W. Fuller. The flex life of 0.00025" film is about 3-fold better than that of 0.0005" film and about 5-fold better than 0.001" film. This property, in addition to the outstanding tensile strength of biaxially oriented polyethylene terephthalate films in general, provides for wide applicability of the biaxially oriented polyester film in the above applications.

As further evidence that a film stretched about $3\times$ in both directions possesses substantially the optimum combination of physical, chemical and electrical properties, is the fact that polyester film stretched appreciably less than $2.5\times$ biaxially frequently exhibits certain irregularities after stretching according to the present process. These irregularities appear in the form of crazed or white areas in the transparent film, and these appear to develop after the heat-setting step of the present process.

The following example will serve to illustrate this phenomenon:

Amorphous polyethylene terephthalate film was conducted into the stretching apparatus described hereinbefore, and the film was stretched $1.8\times$ in the longitudinal direction at a temperature between 80° and 90° C. The film was then subjected to a preheating zone at a temperature between 90°–95° C., and thereafter the film was continuously transversely stretched $3.0\times$ in the transverse direction. Finally, the biaxially stretched film was heat-set at about 150° C. while held under transverse tension. The caliper of the unstretched film was approximately 0.010", and the resulting stretched film was about 0.001". As a result of the heat-setting step, various irregularities in the form of crazed or white spots were formed in the film. This impaired the overall transparency of the film and is believed to be due to non-uniform crystallization in these areas.

In a manner similar to that described above, an amorphous polyethylene terephthalate film (0.050" in thickness) was stretched $2.5\times$ in both directions and heat-set at a temperature of about 200° C. This film also exhibited a few irregularities in the form of crazed or white spots. However, the number of these irregularities per unit area was appreciably less than those in the film of the above example. In general, with films stretched above $2.5\times$ in both directions and heat-set within the range 150°–250° C., the formation of these irregularities is eliminated.

I claim:

1. A process for improving the physical characteristics of polyethylene terephthalate film which comprises stretching a substantially amorphous polyethylene terephthalate film longitudinally at the rate of at least 400% per minute no more than $3.25\times$ at a temperature between 80°–90° C., thereafter transversely stretching said film at the rate of at least 400% per minute no more than $3.25\times$ at a temperature within the range of 95°–110° C., whereby to produce a biaxially stretched film.

2. A process for improving the physical characteristics of polyethylene terephthalate film which comprises stretching a substantially amorphous polyethylene terephthalate film longitudinally at the rate of at least 400% per minute no more than $3.25\times$ at a temperature between 80°–90° C., thereafter transversely stretching said film at the rate of at least 400% per minute no more than $3.25\times$ at a temperature within the range of 95°–110° C., whereby to produce a biaxially stretched film; and finally heat-setting said biaxially stretched film at a temperature within the range of 150°–250° C.

3. A process for improving the physical characteristics of polyethylene terephthalate film which comprises stretching substantially amorphous polyethylene terephthalate film at the rate of at least 400% per minute not more than $3.25\times$ in the longitudinal direction at a temperature within the range of 80°–90° C., thereafter stretching said film at the rate of at lease 400% per minute to substantially the same extent in the transverse direction at a temperature within the range of 95°–110° C., whereby to produce a biaxially stretched balanced film; and finally heat-setting said biaxially stretched film at a temperature within the range 150°–250° C.

4. A process for improving the physical characteristics of polyethylene terephthalate film which comprises stretching substantially amorphous polyethylene terephthalate film at the rate of at least 400% per minute from $2.5\times$ to $3.25\times$ in the longitudinal direction at a temperature within the range of 80°–90° C., thereafter stretching said film at the rate of at least 400% per minute to substantially the same extent in the transverse direction at a temperature within the range of 95°–110° C., whereby to produce a biaxially stretched balanced film; and finally heat-setting said biaxially stretched film at a temperature within the range 150°–250° C.

5. A process for preparing polyethylene terephthalate film which comprises continuously casting a substantially amorphous polyethylene terephthalate film, continuously longitudinally stretching said amorphous film at the rate of at least 400% per minute no greater than $3.25\times$ at a temperature within the range of 80°–90° C., thereafter continuously transversely stretching said film to substantially the same extent at a rate of at least 400% per minute at a temperature within the range of 95°–110° C., and continuously heat-setting the resulting biaxially stretched film at a temperature within the range of 150°–250° C. while maintaining said film under transverse tension.

6. The process of claim 5 wherein the film is stretched within the range of from $2.5\times$ to $3.25\times$.

References Cited in the file of this patent

UNITED STATES PATENTS

| | | |
|---|---|---|
| 2,497,376 | Swallow et al. | Feb. 14, 1950 |
| 2,578,899 | Pace | Dec. 18, 1951 |